United States Patent [19]

Lathrop

[11] Patent Number: 5,028,459
[45] Date of Patent: Jul. 2, 1991

[54] IMITATION STONE COUNTER MATERIAL AND METHOD OF MAKING THE SAME
[75] Inventor: Richard L. Lathrop, Marysville, Wash.
[73] Assignee: Bayliner Marine Corporation, Seattle, Wash.
[21] Appl. No.: 363,190
[22] Filed: Jun. 7, 1989
[51] Int. Cl.$^5$ .......................... B32B 27/12; B44F 9/04
[52] U.S. Cl. ........................................ 428/15; 156/61; 156/78; 156/245; 264/74; 264/258
[58] Field of Search .................. 428/15; 156/61, 78, 156/245; 264/74, 258

[56] References Cited
U.S. PATENT DOCUMENTS

| | | | |
|---|---|---|---|
| 3,773,886 | 11/1973 | Starr et al. | 428/15 X |
| 4,209,862 | 7/1980 | Cortes-Garza | 428/15 X |
| 4,244,993 | 1/1981 | Platka, III et al. | 428/15 |
| 4,248,816 | 2/1981 | Sheridan | 428/15 X |
| 4,343,752 | 8/1982 | Cann | 428/15 X |
| 4,657,791 | 4/1987 | Ukkonen | 428/15 |
| 4,664,954 | 5/1987 | Hurd | 428/15 |
| 4,877,656 | 10/1989 | Baskin | 156/61 X |

Primary Examiner—Henry F. Epstein
Attorney, Agent, or Firm—Seed and Berry

[57] ABSTRACT

There is provided an imitation stone counter material and a method of making the same. In one embodiment, the material consists of a layer of gel coat over a stone matrix layer. The matrix layer mixture consists of a hardenable resin, a thickening agent, and a crushed stone aggregate. To the stone matrix layer is applied a layer of fiberglass and curable resin. In an alternative embodiment, alternating layers of foam and fiberglass are applied to the stone matrix layer to provide the desired structural integrity to the final imitation stone counter material.

24 Claims, 4 Drawing Sheets

IMITATION STONE COUNTER MATERIAL AND METHOD OF MAKING THE SAME

FIELD OF THE INVENTION

The present invention relates to a simulated stone counter material and methods of manufacturing the same.

BACKGROUND OF THE INVENTION

Countertops have traditionally been made from a variety of materials including marble or other ornamental stone. While stone countertops provide aesthetically pleasing surfaces, they are difficult to ship to normal trucking transportation due to their weight and tendency to chip and crack if subjected to shock loading.

A variety of simulated ornamental stone countertops have been cast commercially. For example, a process for forming simulated marble material is disclosed in U.S. Pat. No. 3,773,886 wherein a polyester gel coat is applied to a mold surface followed by successively applying veining and spatter compositions, then filling the remainder of the mold with resin. Similarly, U.S. Pat. No. 4,664,954 discloses a process for forming simulated ornamental stone by mixing alumina trihydrate powder with polyester resin and catalyst to yield a translucent material which may be used as a depth simulating layer to cover a colored veining material.

While the simulated ornamental stone of the prior art is lighter in weight than the actual stone itself, these materials are still too heavy for a variety of applications. For example, on power boats and sail boats a lightweight counter is desirable. Furthermore, the prior art products are too fragile to allow for truck shipment to remote manufacturing sites.

DISCLOSURE OF THE INVENTION

Accordingly, it is an object of this invention to provide a lightweight simulated counter material for use in applications where a lightweight material is desirable, and a method for making the material. It is an additional object of the present invention to provide such a counter that is both aesthetically pleasing and structurally suitable for use as a counter. Still another object of the present invention is to provide a lightweight simulated stone counter material which is strong and can absorb shocks.

Briefly stated, the present invention discloses a lightweight imitation stone counter material of excellent structural integrity. The surface of the counter resembles a stone, such as granite, due to the use of a crushed stone aggregate as the stone-simulating material. The counter is formed from a series of layers which provide structural integrity to the material and yet achieves a lightweight product. The structure can be free-formed around corners. The product is lightweight, and is strong and shock-resistant enough for shipping long distances.

DETAILED DESCRIPTION OF THE INVENTION

Figure 1:
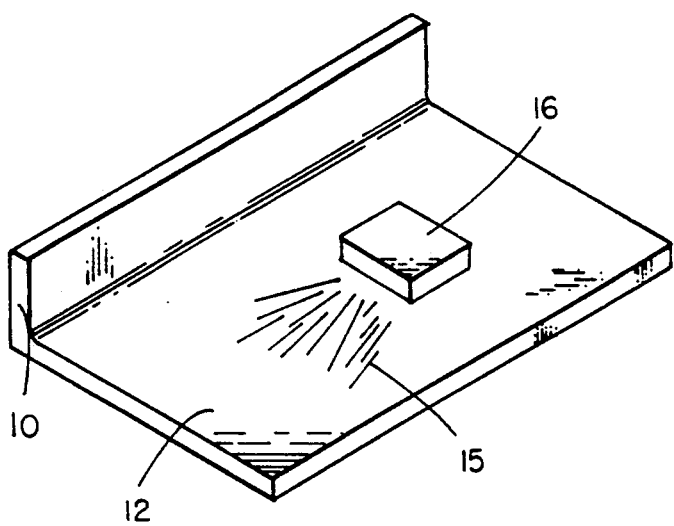
FIG. 1 is a perspective view of the application of a release agent to a mold surface of the first step in a process for making the material.

The imitation stone counter material of the present invention is prepared by the application of a series of layers to a mold surface. Referring to FIG. 1, mold 10 is prepared by cleaning its interior surface 12 and applying a wax or other release agent 15. The release agent permits separation of the mold from the imitation stone counter material after the layup of the material is complete. The wax or release agent may conveniently be applied by sponge 16, and need only be reapplied every three to five layups as necessary.

Figure 2:
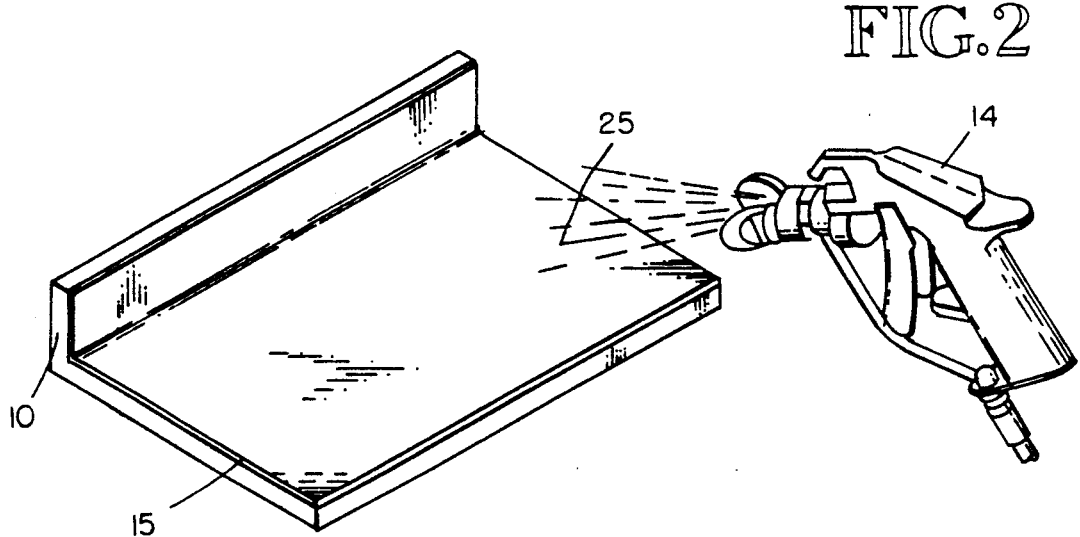
FIG. 2 is a perspective view of the application of a gel coat layer to the release agent to FIG. 1.

Referring to FIG. 2, a clear layer of gel coat is applied by, for example, spraying device 14 to mold 10 treated with release agent 15. It should be understood that the use of a curable resin gel coat is well recognized in the art and will not be discussed in any great detail herein. Preferably the gel coat is a polyester resin, catalyzed with a suitable catalyst, such as methyl ethyl ketone ("MEK") peroxide. The gel coat is applied to a thickness of between 15 to 25 mils, preferably about 18 to 20 mils. If the thickness of the gel coat is much greater than about 25 mils, the gel coat is a tendency to discolor. If less that about 15 mils, the imitation counter material may suffer due to a lower surface impact strength. The gel coat is allowed to set prior to application of subsequent layers. The term "set", as used herein, means that the layer has cured sufficiently to prevent a subsequent layer from penetrating, yet permitting the layers to alligate.

Figure 3:
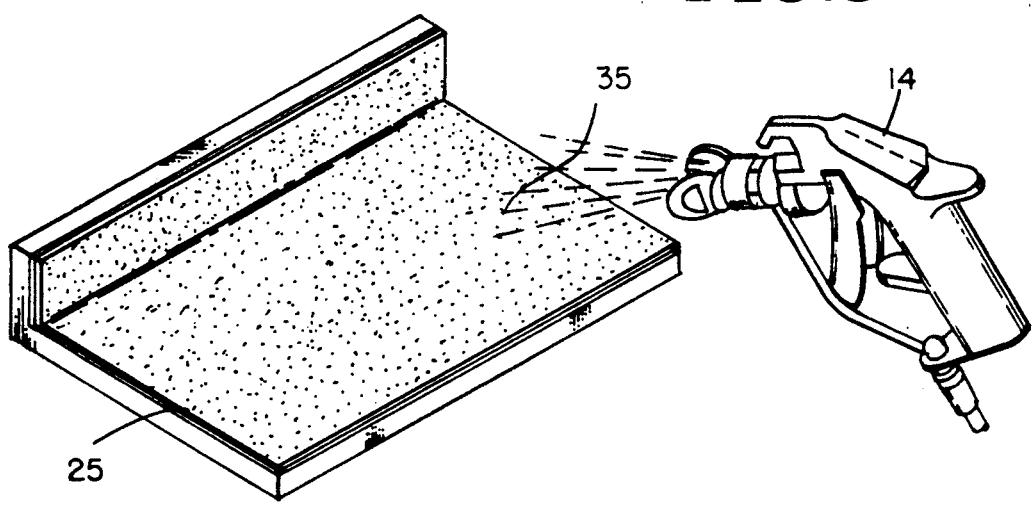
FIG. 3 is a perspective view of the application of a crushed stone aggregate matrix being applied to the gel coat layer of FIG. 2.

Referring to FIG. 3, to the gel coat layer 25 is applied a curable crushed stone aggregate matrix 35. The matrix preferable includes a curable resin, a thickening agent and a crushed stone aggregate. The curable resin may be either a polyester, urethane, epoxy or other suitable resin, preferably a polyester resin. Suitable thickening agents may be aluminum trihydrate, calcium carbonate or the like. The crushed stone aggregate may be crushed granite or vermiculite, or any suitable stone material which produces the desired esthetic results. The crushed stone aggregate matrix may optionally contain other materials, such as brass shavings, to alter the appearance of the resulting counter material.

A preferable stone matrix includes aluminum trihydrate and crushed granite aggregate in a medium of catalyzed polyester resin. The mixture is proportioned to yield a viscosity suitable for spray application. The crushed stone aggregate is conventional as used for cast products.

The crushed stone matrix is uniquely modified for application by spraying and is applied to a thickness which completely covers the gel coat layer. The viscosity of the matrix is controlled by the addition of the thickness agent. The matrix may be applied with an undercoating spray gun such as the "Elder 100" (manufactured by Elder & Sons Manufacturing Company, Orlando, Florida) with an opening approximately ¼ inch, i.e., a number 9" tip. Using such a spray gun and tip, it is necessary to employ a crushed stone with a particle size of approximately 1/16 inch. If the particle size is too large, the spray tip will become clogged and require frequent cleaning. The matrix may be catalyzed with any suitable catalyst depending upon the resin used. For example, if polyester serves as the curable resin, a catalyst such as MEK peroxide may be conveniently used in an amount from 0.5 to 3 percent by weight of the polyester resin.

Figure 4:
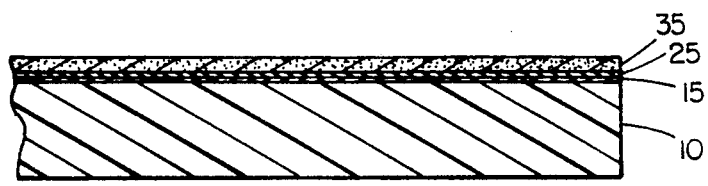
FIG. 4 is a cross-sectional view of one embodiment of the stone counter material of the present invention showing the layers as applied in FIGS. 1-3 prior to removal from the mold.

Referring to FIG. 4, a cross-sectional view of one embodiment of the present invention is illustrated. After application of the layers depicted in FIG. 2 and FIG. 3, the gel coat layer 25 and stone aggregate layer 35 are allowed to cure. The sheet of imitation stone counter material is then separated from the mold 10 along the layer of release agent 15. Due to the thinness of the material, the sheet will crack if care is not taken to prevent the material from bending upon removal from the mold. The sheet may then be fixed to a suitable support, such as plywood, to provide an imitation stone counter material. Alternatively, to save weight the sheet may be glued to a variety of different types of sheets, for example rigid foam, such as polyvinyl chloride ("PVC") foam, or aluminum honeycomb which may then serve as the counter top material. Alternatively, the support may be fixed to the imitation stone counter material prior to removal from the mold.

Figure 5:
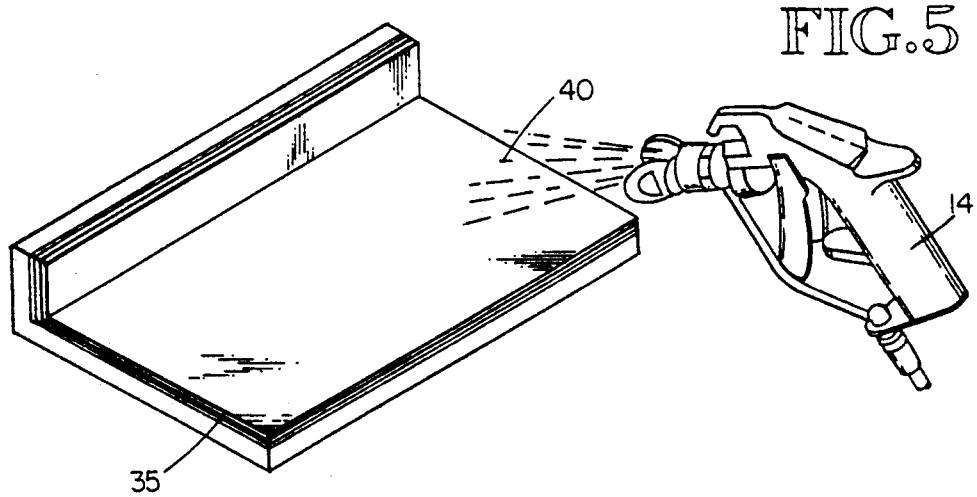
FIG. 5 is a perspective view of the application of a fiberglass and curable resin layer being applied to the crushed stone aggregate matrix layer of FIG. 3.

In another embodiment of the present invention, a layer of fiberglass and curable resin 40 is applied, as depicted in FIG. 5, to the stone matrix layer 35 of FIG. 3. The fiberglass and resin layer is applied to a thickness sufficient to provide tensile strength to the material for the specific application. For example 3-4 onces of fiberglass per square foot is desirable for marine counter applications. The curable resin may be polyester, urethane or epoxy resin and the like, catalyzed with a suitable catalyst. For purposes of convenience, the fiberglass and curable resin layer may be applied by a spraying device 14.

Figure 6:
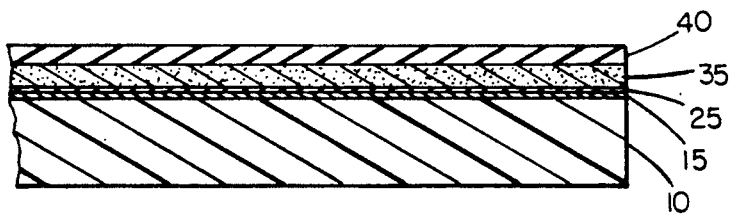
FIG. 6 is a cross-sectional view of another embodiment of the imitation stone counter material of the present invention depicting the layers as applied to FIGS. 1-3 and 5 prior to removal from the mold.

Referring to FIG. 6, a cross-sectional view of this embodiment of the invention is illustrated. The layers of gel coat 25, crushed stone matrix 35 and fiberglass and curable resin 40 are allowed to cure and then separated from mold 10 along the layer of release agent 15 to yield the imitation stone counter material. This material may then be used directly or fixed to suitable support, such as PVC foam. The material may be used on site or shipped to a distant location to be installed at a later time.

Since the imitation stone counter material may be produced from an open face mold, a variety of counter shapes may be made. For example, a counter with an integral sink may be produced by utilizing a mold containing a bowl-shaped depression. The rigidity of the material may be controlled by the thickness of the fiberglass and resin layer. If specific locations upon the imitation stone counter need added support or strength, an increased thickness of fiberglass and curable resin maybe applied to that location upon lay-up of the material. In addition, further support may be provided by fixing to the layer of fiberglass and curable resin a support member such as PVC foam in desired locations.

Figure 7:
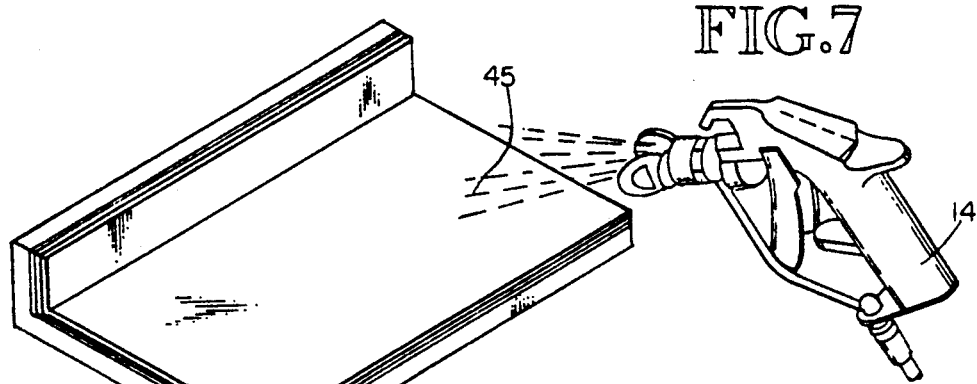
FIG. 7 is a perspective view of the application of a first layer of hardenable foam to the crushed stone aggregate matrix layer of FIG. 3.

Referring to FIG. 7 through FIG. 11, still another embodiment of the present invention is illustrated. As depicted in FIG. 7, a first layer of hardenable or curable foam resin 45, such as polyester foam, is applied to the stone matrix layer 35 by a suitable spraying device 14 and allowed to set. The thickness of the foam layer may vary depending upon the application and desired rigidity of the counter material. Preferably the foam layer will be approximately ⅛ to ¼ inch thick. Although a thin foam layer is depicted in this embodiment, a thicker layer of foam may be utilized depending upon the particular end use of the counter material and the structural strength desired.

Figure 8:
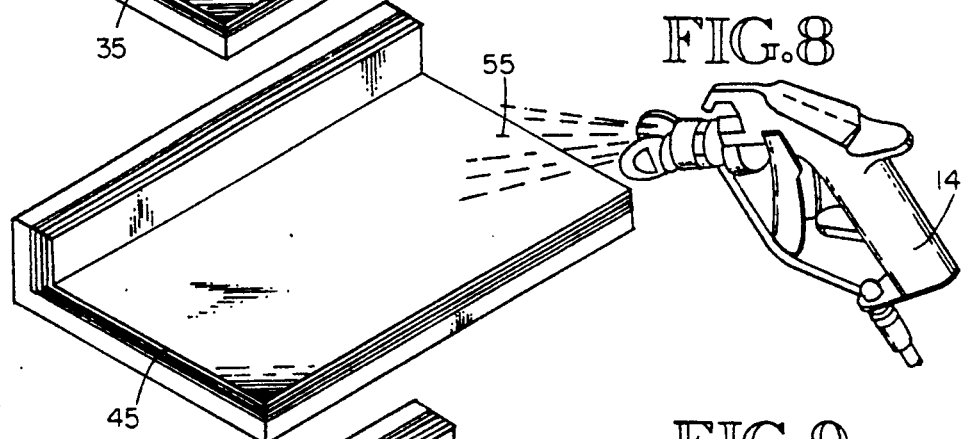
FIG. 8 is a perspective view of the application of a first layer of fiberglass and curable resin to the first layer of hardenable foam of FIG. 7.

As depicted in FIG. 8, a first layer of fiberglass and curable resin 55 is then applied to the first layer of hardenable foam 45. The first layer of fiberglass is preferably thin and only enough required to add tensile strength and to seal the first layer of foam, preferably approximately 1 and ½ ounces per square foot. The curable resin of this layer is preferably catalyzed polyester resin. The fiberglass and curable resin layer is then allowed to set.

Figure 9:
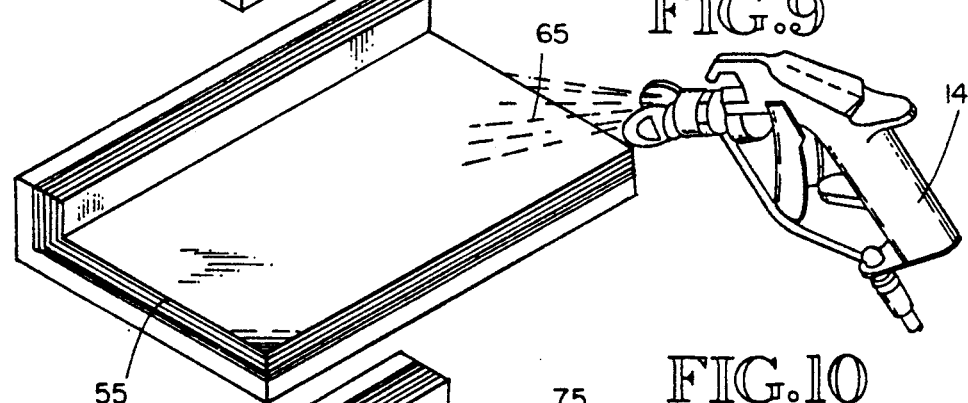
FIG. 9 is a perspective view of the application of a second layer of hardenable foam to the first layer of fiberglass and curable resin in FIG. 8.

Referring to FIG. 9, a second layer of hardenable foam 65 is applied to the surface of the first layer of fiberglass and curable resin 55 and allowed to set. By varying the thickness of the foam, the stiffness of the resulting material may be effected. For example, a thicker layer of foam will produce a stiffer material. The second layer of foam may desirably be approximately ½ inch in thickness, preferably the foam is applied to a thickness of ¼ inch.

Figure 10:
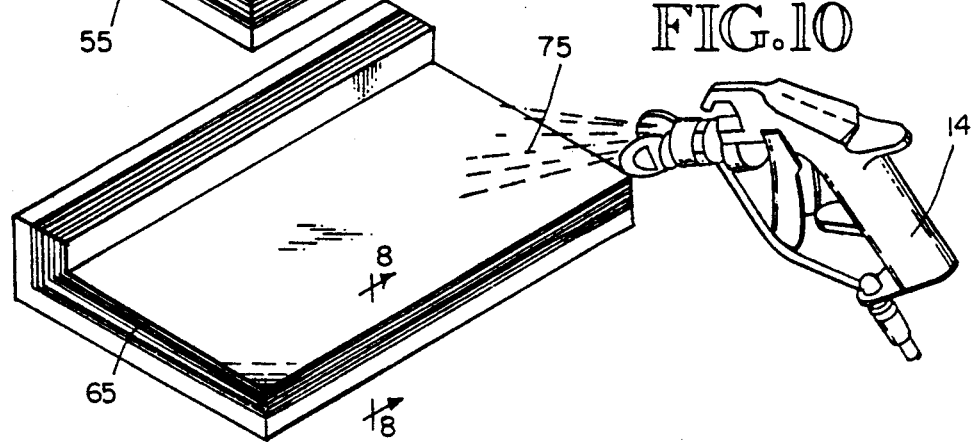
FIG. 10 is a perspective view of the application of a second layer of fiberglass and curable resin to the second layer of hardenable foam of FIG. 9.

Referring to FIG. 10, a second layer of fiberglass and curable resin 75 is applied to the surface of the second foam layer 65. Again, by varying thickness of the respective layers, the strength of the material may be controlled.

Figure 11:
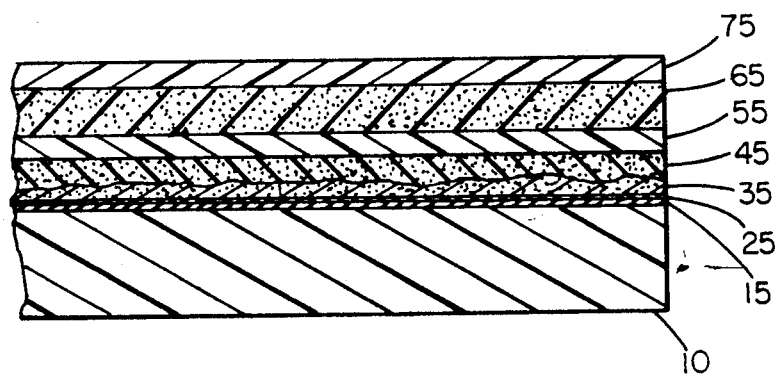
FIG. 11 is a cross-sectional view of still another embodiment of the imitation stone counter material of the present invention showing the various layers as applied to FIGS. 1-3 and 7-10 prior to removal from the mold.

Referring to FIG. 11, a cross-sectional view of the simulated ornamental stone material prior to separation from the mold is shown. In a preferred embodiment, the cross section depicts mold 10 treated with a release agent 15, a layer of clear polyester gel coat 25, a layer of crushed granite aggregate 35, a first layer of polyester foam 45, a first layer of fiberglass and polyester resin 55, a second layer of polyester foam 65, and a second layer of fiberglass and polyester resin 75. The cured material is then separated from the mold 10 along the release agent layer 15 and the process may be repeated.

The imitation stone counter material formed by the process disclosed herein is considerably lighter than imitation stone countertops prepared by the prior art. It is also stronger and more shock resistant than the prior art countertops. This permits the use of such material in a variety of applications such as power boats, sail boats, and recreational vehicles where weight and fuel consumption is an important consideration. Moreover, the light weight and shock resistance makes long distance truck shipping of the counter material feasible.

Because the material is formed from an open-faced mold, a variety of shapes may conveniently be formed from the material. For example, a variety of three-dimensional shape may be produced to precisely fit and complement the galley arrangement of a boar or kitchen of a recreational vehicle. The material is both aesthetically pleasing and suitably durable for counter use.

While particular embodiments of this invention have been shown and described, it will be apparent that many modifications and changes will be made thereto without departing from the true scope of the invention. All such changes and modifications, therefore, are deemed to be a part of this invention.

We claim:

1. A method for preparing a simulated stone counter material, comprising:
   a. preparing an open face mold surface with a release agent;
   b. applying a substantially clear, hardenable resin coating to the mold surface;
   c. permitting the hardenable resin coating to sufficiently set;
   d. applying a hardenable, stone matrix mixture to the resin coating, the hardenable, stone matrix mixture comprising a thickening agent, a crushed stone aggregate and a hardenable resin, wherein the stone matrix mixture is applied to the resin coating by spraying;
   e. permitting the stone matrix mixture to sufficiently set;
   f. applying a layer of fiberglass and curable resin to the stone matrix mixture;
   g. allowing the layers to cure, thus forming the simulated stone counter material; and
   h. separating the mold from the simulated stone counter material.

2. The method of claim 1 wherein the substantially clear hardenable resin coating is a catalyzed polyester gel coat applied to a thickness of about 20 mils.

3. The method of claim 1 wherein the stone matrix thickening agent is selected from the group consisting of aluminum trihydrate and calcium carbonate.

4. The method of claim 1 wherein the stone matrix crushed stone aggregate is selected from the group consisting of granite and vermiculite.

5. The method of claim 1 wherein the stone matrix hardenable resin is selected from the group consisting of catalyzed polyester, urethane and epoxy resin.

6. The method of claim 5 wherein the hardenable resin is catalyzed polyester resin.

7. The method of claim 1 wherein the curable resin of the fiberglass and curable resin layer is selected from the group consisting of catalyzed polyester, urethane, and epoxy resin.

8. The method of claim 1 wherein the curable resin of the fiberglass and curable resin layer is catalyzed polyester resin.

9. A method for preparing a simulated stone counter material, comprising:
   a. preparing an open face mold surface with a release agent;
   b. applying a substantially clear, hardenable resin coating to the mold surface;
   c. permitting the hardenable resin coating to sufficiently set;
   d. applying a hardenable, stone matrix mixture to the resin coating, the hardenable, stone matrix mixture comprising a thickening agent, a crushed stone aggregate and a hardenable resin, wherein the stone matrix mixture is applied to the resin coating by spraying;
   e. permitting the stone matrix mixture to sufficiently set;
   f. applying a first layer of hardenable foam resin to the stone matrix layer;
   g. permitting the first layer of hardenable foam resin to sufficiently set;
   h. applying a first layer of fiberglass and hardenable resin to the first layer of hardenable foam resin;
   i. allowing the layers to cure, thus forming the simulated stone counter material; and
   j. separating the mold from the simulated stone counter material.

10. The method of claim 9 further including, after step h and before step i:
    permitting the first layer of fiberglass and hardenable resin to sufficiently set;
    applying a second layer of hardenable foam resin to the first layer of fiberglass and hardenable resin:
    permitting the second layer of hardenable foam resin to sufficiently set; and
    applying a second layer of fiberglass and hardenable resin to the second layer of hardenable foam resin.

11. The method of claim 10 wherein the substantially clear hardenable resin coating is a catalyzed polyester gel coat applied to a thickness of about 20 mils.

12. The method of claim 9 wherein the stone matrix thickening agent is selected from the group consisting of aluminum trihydrate and calcium carbonate.

13. The method of claim 9 wherein the stone matrix crushed stone aggregate is selected from the group consisting of granite and vermiculite.

14. The method of claim 9 wherein the stone matrix hardenable resin is selected from the group consisting of catalyzed polyester, urethane and epoxy resin.

15. The method of claim 14 wherein the hardenable resin is catalyzed polyester resin.

16. The method of claim 9 wherein the curable foam resin is selected from the group consisting of catalyzed polyester foam resin and poly vinyl chloride foam resin.

17. The method of claim 9 wherein the first hardenable foam resin layer is catalyzed polyester foam resin.

18. The method of claim 10 wherein the second hardenable foam resin layer is catalyzed polyester foam resin.

19. The method of claim 9 wherein the hardenable resin of the first fiberglass and hardenable resin layer is selected from the group consisting of catalyzed polyester, urethane, and epoxy resin.

20. The method of claim 9 wherein the hardenable resin of the first fiberglass and hardenable resin layer is catalyzed polyester resin.

21. The method of claim 10 wherein the hardenable resin of the second fiberglass and hardenable resin layer is selected from the group consisting of catalyzed polyester, urethane, and epoxy resin.

22. The method of claim 10 wherein the hardenable resin of the second fiberglass and hardenable resin layer is catalyzed polyester resin.

23. A simulated stone counter material prepared according to the method of claim 1.

24. A simulated stone counter material prepared according to the method of claim 9.

* * * * *